(12) United States Patent
Drutowski et al.

(10) Patent No.: US 7,155,969 B2
(45) Date of Patent: Jan. 2, 2007

(54) SYSTEM FOR AND METHOD OF ACOUSTIC AND THROUGH SKIN AIR DATA MEASUREMENT

(75) Inventors: Karl Gable Drutowski, Inver Grove Heights, MN (US); Dennis James Cronin, Shakopee, MN (US); Derrick David Hongerholt, Eagan, MN (US)

(73) Assignee: Rosemount Aerospace Inc., Brunsville, MN (US)

( * ) Notice: Subject to any disclaimer, the term of this patent is extended or adjusted under 35 U.S.C. 154(b) by 588 days.

(21) Appl. No.: 10/732,092

(22) Filed: Dec. 10, 2003

(65) Prior Publication Data

US 2005/0131591 A1    Jun. 16, 2005

(51) Int. Cl.
*G01F 13/00* (2006.01)

(52) U.S. Cl. .................. 73/170.14; 73/170.02

(58) Field of Classification Search ............. 73/170.14, 73/181, 170.02, 861.06
See application file for complete search history.

(56) References Cited

U.S. PATENT DOCUMENTS

| | | | |
|---|---|---|---|
| 5,040,415 A * | 8/1991 | Barkhoudarian ............. 73/198 |
| 5,257,536 A * | 11/1993 | Beigbeder et al. ............. 73/180 |
| 5,585,557 A | 12/1996 | Loschke et al. ......... 73/170.14 |
| 6,568,260 B1 * | 5/2003 | Hakenesch ................. 73/178 R |
| 6,772,976 B1 * | 8/2004 | Rouse et al. ................. 244/1 R |

* cited by examiner

*Primary Examiner*—Jewel Thompson
(74) *Attorney, Agent, or Firm*—John D. Veldhuis-Kroeze; Westman, Champlin & Kelly, P.A.

(57) ABSTRACT

A system for determining physical characteristics of an incident flow stream over a surface of a vehicle includes a plurality of acoustic sensors mounted to the surface and configured to sense pressure fluctuations caused by the incident flow stream. The plurality of acoustic sensors provide output signals indicative of the sensed pressure fluctuations. Processing circuitry coupled to the plurality of acoustic sensors, measures flow velocity in a first direction as a function of the output signals of at least two of the plurality of acoustic sensors, and measures flow velocity in a second direction as a function of the output signals of at least two of the plurality of acoustic sensors. The processing circuitry is configured to calculate an angular direction of flow as a function of the first and second measured flow velocities.

33 Claims, 7 Drawing Sheets

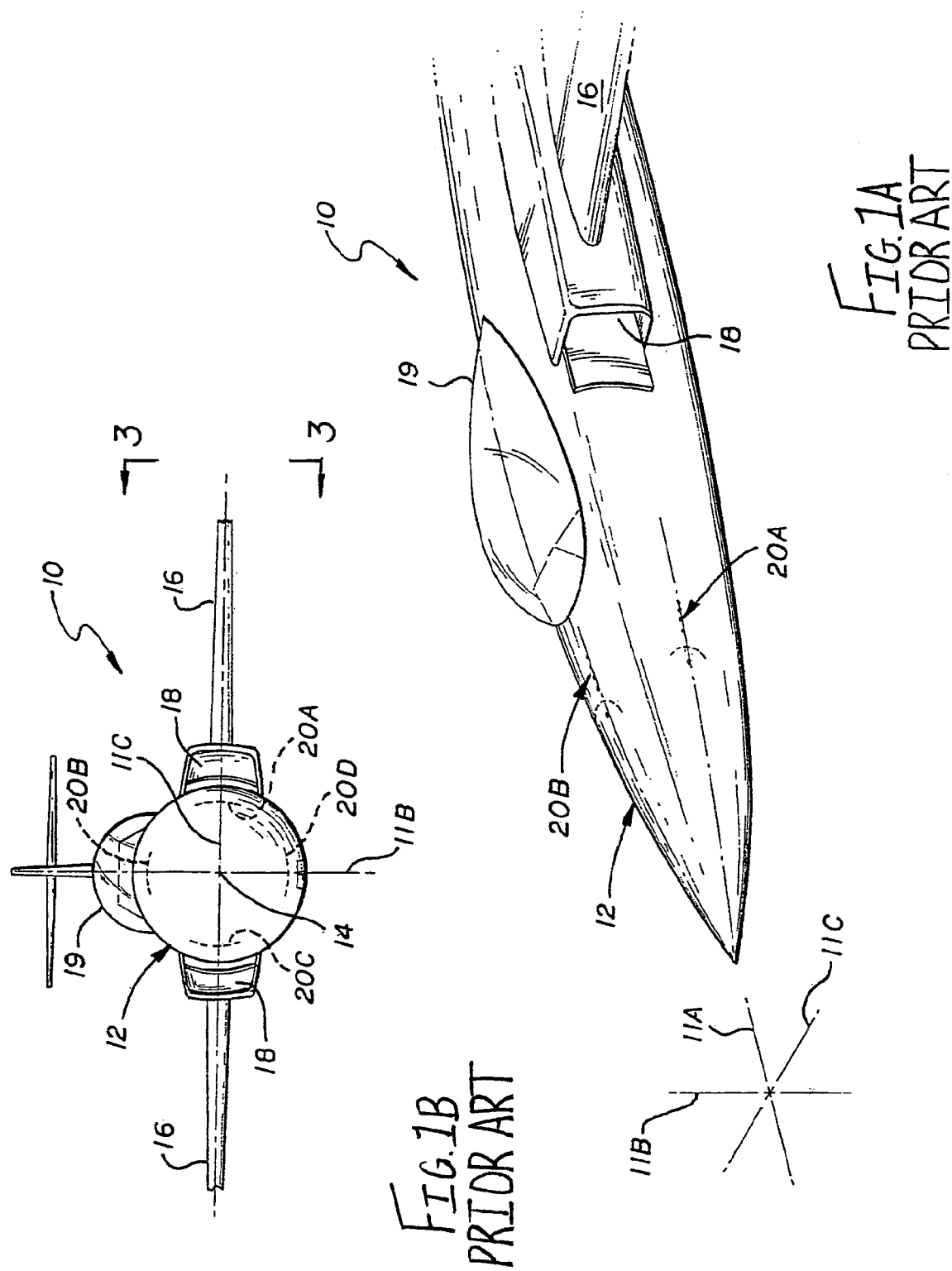

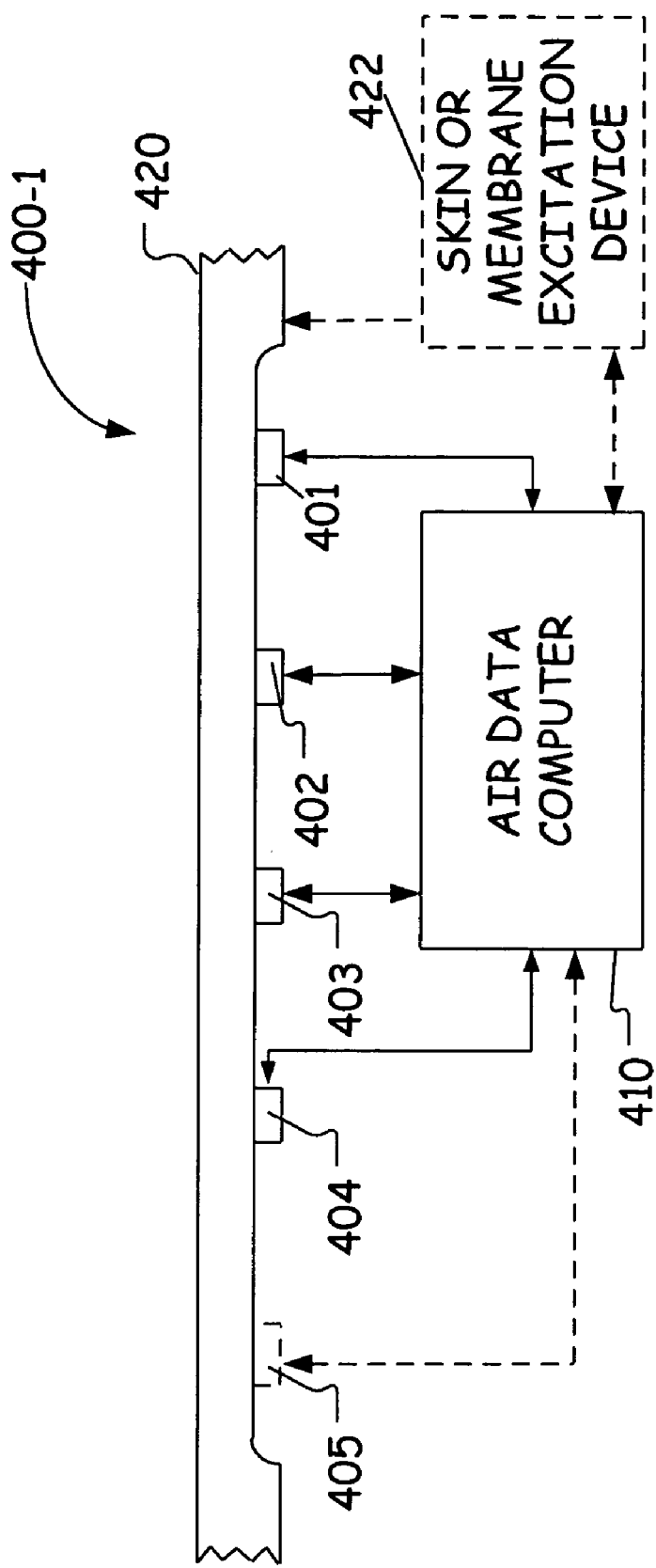

SYSTEM FOR AND METHOD OF ACOUSTIC AND THROUGH SKIN AIR DATA MEASUREMENT

BACKGROUND OF THE INVENTION

The present invention relates to air data measurement systems. More particularly, the present invention relates to acoustic air data measurement systems.

Aircraft air data systems commonly utilize pitot tubes and/or multi-function probes to measure air data related pressures. These aircraft air data systems utilize the measured pressures to calculate air data parameters for an aircraft, such as airspeed and angle of attack. Other air data systems utilize acoustic sensors, instead of pressure sensors, in order to estimate parameters such as local airspeed and local angle of attack of the aircraft.

These acoustic air data systems can be based upon the principle that the transmission time of sound waves in a fluid along a given path is a function of the local acoustic velocity and the local fluid velocity component parallel to that path. Thus, some of these systems are based on the concept of transmitting an acoustic signal generated by an electromechanical transducer (e.g., a sound source) through the fluid medium to one or more downstream receivers, and measuring the travel time to each downstream receiver. Still other acoustic air data systems utilize only passive acoustic sensors, and do not utilize an electromechanical transducer or sound source. One such air data system is disclosed in U.S. Pat. No. 5,585,557 to Loschke et al., which issued on Dec. 17, 1996, and which is hereby incorporated by reference in its entirety.

In the air data system disclosed in the Loschke et al. patent, an equidistant array of microphones are set a certain distance from a reference microphone. The angle of attack of the airflow is measured by finding the microphone in the array of microphones whose output has the highest correlation coefficient with the reference microphone output. The corresponding assumption of attached flow is then made. Since this known configuration allows for flow measurement only in the direction from the reference microphone to one of the microphones in the array of microphones, this air data system suffers the disadvantage that the resolution for the angle of attack measurement is limited by the number of microphones in the equidistant array. In order to achieve high resolution in the angle of attack measurement or estimation, a large number of array microphones must be used. This increases the cost of the system. Using a large number of array microphones also increases the system complexity, making manufacturing and installation of the system more difficult, and potentially reducing the field reliability of the system. A second disadvantage of this type of system is that air data can only be inferred if the flow direction is from the reference microphone to the array. In other words, these systems are uni-directional. This limits the usefulness of these systems. For example, a uni-directional system has limitations in uses such as helicopters.

Consequently, an acoustic air data system which overcomes one or more of the previously described problems, or other problems not described, or which provides advantages over prior art air data systems, would be a significant improvement in the art.

SUMMARY OF THE INVENTION

A system for determining physical characteristics of an incident flow stream over a surface of a vehicle includes a plurality of acoustic sensors mounted to the surface and configured to sense pressure fluctuations caused by the incident flow stream. The plurality of acoustic sensors provide output signals indicative of the sensed pressure fluctuations. Processing circuitry, coupled to the plurality of acoustic sensors, measures flow velocity in a first direction as a function of the output signals of at least two of the plurality of acoustic sensors, and measures flow velocity in a second direction as a function of the output signals of at least two of the plurality of acoustic sensors. The acoustic sensors used to sense flow in the first direction can be separate from the sensors used to sense flow the second direction. In the alternative, a common sensor can be used in the two measurements if desired. The processing circuitry is configured to calculate an angular direction of flow as a function of the first and second measured flow velocities.

In some embodiments of the invention, a system for determining physical characteristics of an incident flow stream over an outer surface of a vehicle is provided. The system includes a plurality of sensors mounted to a first surface. The first surface is adjacent the outer surface of the vehicle. The plurality of sensors are configured to sense movement of the first surface caused by pressure fluctuations due to the incident flow stream, and to provide output signals indicative of the sensed movement of the first surface and thereby of the pressure fluctuations. Processing circuitry coupled to the plurality of sensors is configured to determine the physical characteristics of the incident flow stream as a function of the sensor output signals.

BRIEF DESCRIPTION OF THE DRAWINGS

FIGS. 1A–1C are illustrations of various aspects of a prior art acoustic air data system.

FIGS. 4A–4D are diagrammatic illustrations of through the skin air data configurations.

DETAILED DESCRIPTION OF THE PREFERRED EMBODIMENTS

The present invention includes improvements over existing acoustic air data systems. For example, the present invention includes improvements over the acoustic air data system disclosed by Loschke et al. in U.S. Pat. No. 5,585,557, which is herein incorporated by reference in its entirety. More specifically, the present invention includes an acoustic air data system having an acoustic sensor configuration in which only three or four microphones or sensors are required. By contrast, the system described in Loschke et al. requires a larger number of microphones, with the number of microphones being dependent upon the precision desired. The disclosed configuration works well for separated flows in which the airflow is separated from the airfoil and sometimes spins back toward the direction from which it came. As will be discussed below in greater detail, the present invention provides for sensing flow in positive component velocity directions. This allows separated flows to be measured as well. It also minimizes the number of sensors required. Thus, the present invention provides potential cost and range of application benefits over some prior art acoustic air data systems. The present invention also includes further improvements relating to through the aircraft skin air data measurement methods and apparatus.

Figure 1C:
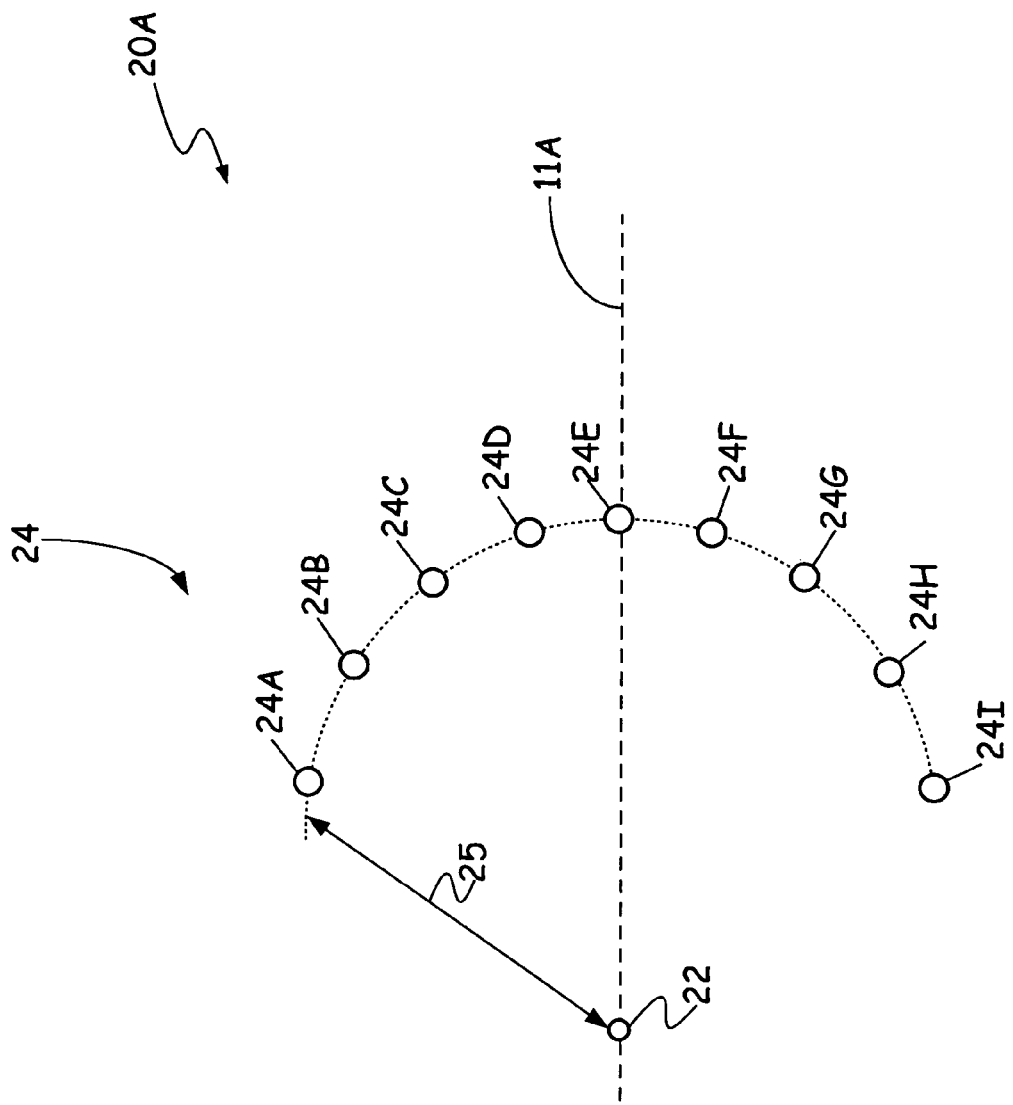

For purposes of illustration, a basic description of an acoustic air data system such as the one disclosed in the Loschke et al. patent is provided with reference to FIGS. 1A–1C. As shown in FIGS. 1A and 1B, an aircraft generally indicated by reference number 10 is shown to have a longitudinal axis 11A, a vertical axis 11B, and a lateral axis 11C. The aircraft 10 includes a fuselage 12 having a nose 14, wings 16, engine inlets 18 and a cockpit 19. Four hydrodynamic air data systems 20A–20D are mounted on the fuselage 12 in proximity to the nose 14.

The system 20A includes a first hydrodynamic sensor 22 (reference sensor or microphone) and an array 24 of second hydrodynamic sensors 22A–24I mounted in an arc behind and equidistant from the reference sensor 22, with the distance indicated by reference number 25. As illustrated, the sensor 22 is located on the longitudinal axis 11A, with the number of second hydrodynamic sensors 24A–24I equally distributed on either side thereof. Hydrodynamic sensor 24E is positioned on the axis 11A. Other types of sensors, such as static pressure sensors, passive radiometers, anemometers, etc, can be mounted on the longitudinal axis behind array 24. The air data system 20C is mounted on the opposite side of the aircraft in a similar fashion, while air data systems 20B and 20D are mounted ninety degrees thereto with the sensor 22 and array 24 of these systems aligned with the vertical axis 11B of the aircraft.

For each of the air data systems 20A–20D, cross-correlation analysis can be used to determine the time lag or delay between the convected turbulent boundary layer pressure fluctuations at the reference sensor 22 and the corresponding pressure fluctuations received by the sensors 24A–24I. The sensor 24A–24I with pressure fluctuations having the highest correlation with the pressure fluctuations at reference sensor 22 can then be used in making assumptions of airflow direction (relative to the reference sensor 22), angle of attack, etc. As discussed above, such a system is limited in resolution by the number of sensors in the array 24. Including a large number of sensors in the array 24 in order to achieve higher resolution results in increased costs and system complexity.

The present invention includes hydrodynamic air data systems which require only three or four acoustic microphones or sensors to provide high resolution information regarding the angle of attack of airflow, instead of requiring a reference sensor and a large number of array sensors. Illustrated embodiments of the present invention utilize four sensors to provide this information. However, it will be seen that three sensor embodiments are also possible.

Figure 2:
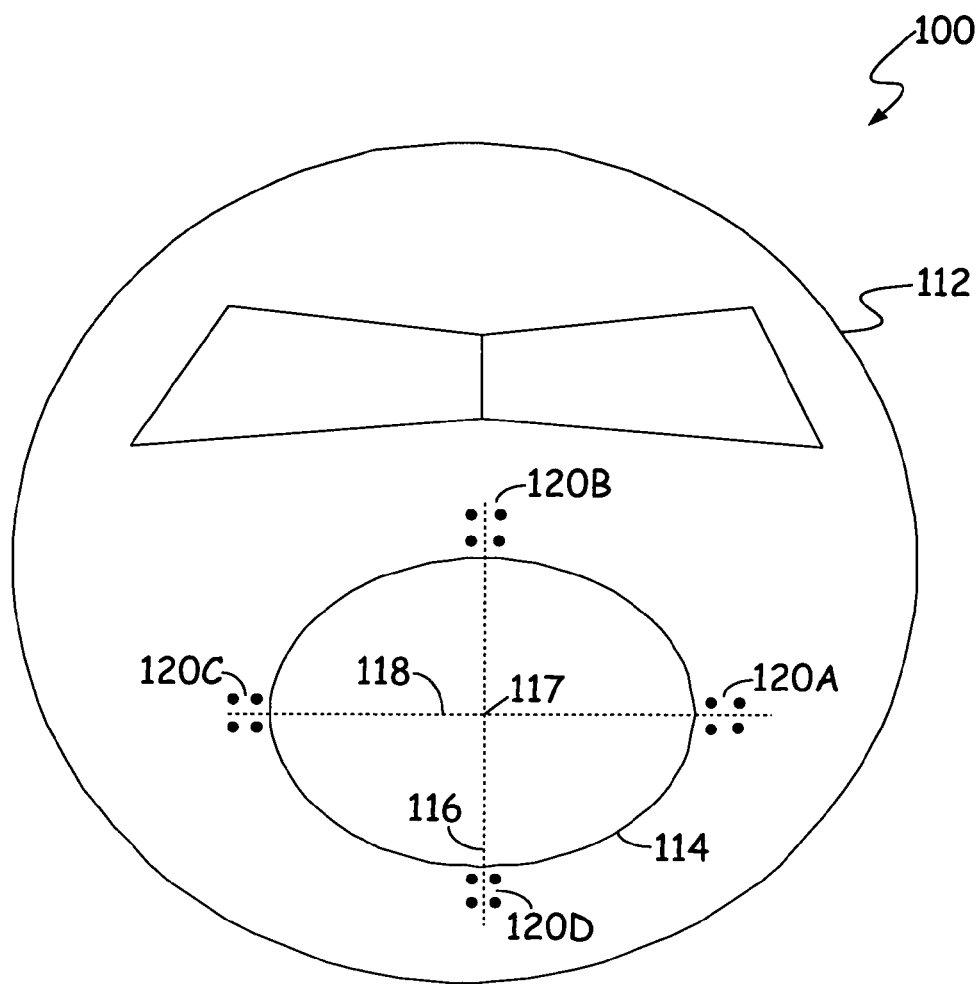
FIG. 2 is a diagrammatic front view illustration of an aircraft having acoustic air data systems in accordance with the present invention, installed thereon.

FIG. 2 is a front diagrammatic view of an aircraft 100 which includes four such air data systems 120A–120D. Aircraft 100 includes a fuselage 112 having a nose 114. In the particular embodiment illustrated, each of the four air data systems is centered either on vertical axis 116 or lateral axis 118, which intersect near a center 117 of nose 114. However, the present invention is not limited to use of four air data systems such as systems 120A–120D, nor is the present invention limited to this particular placement of the air data systems.

Figure 3:
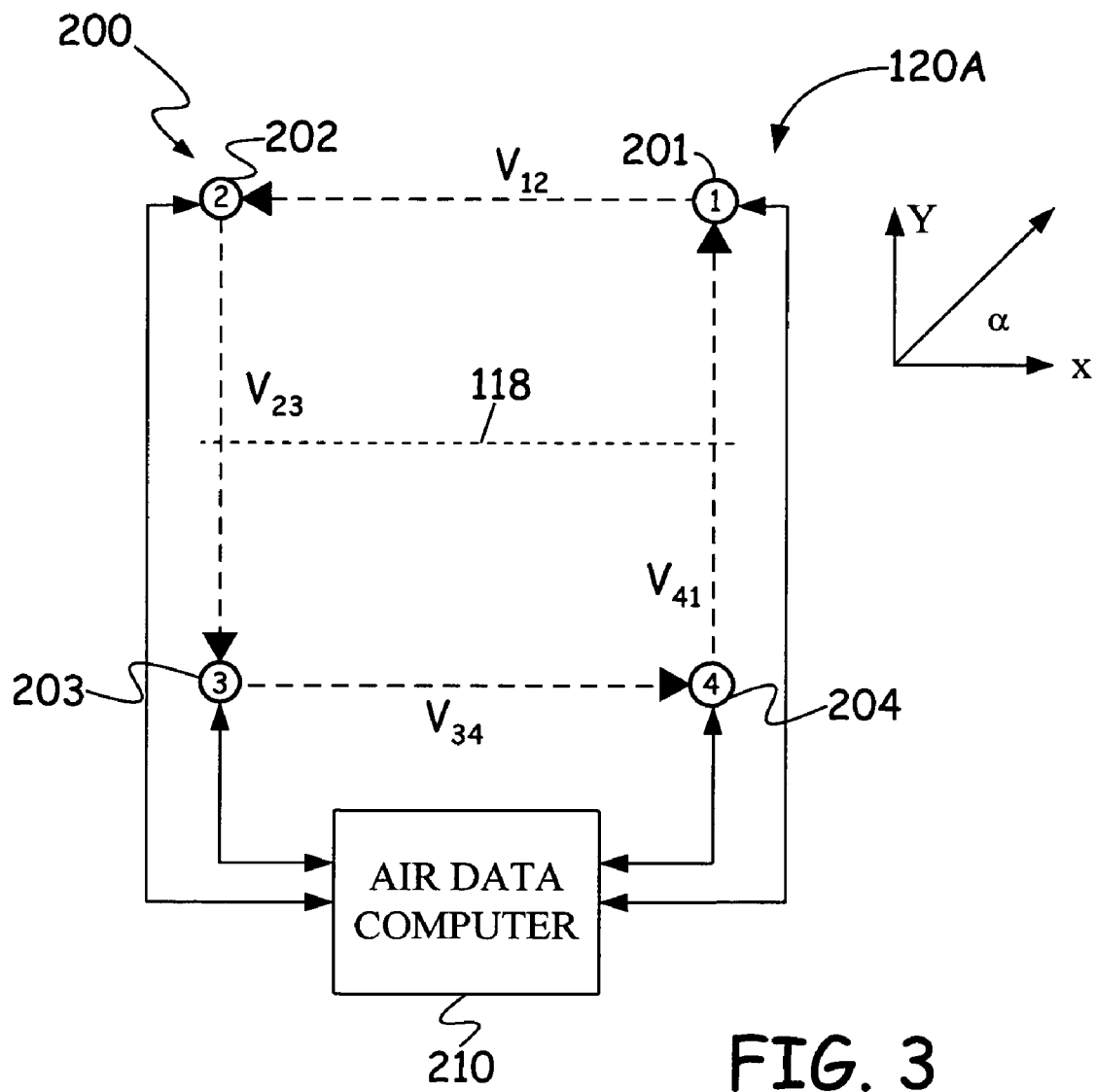
FIG. 3 is a diagrammatic illustration of one of the acoustic air data systems shown in FIG. 2.

FIG. 3 is a diagrammatic illustration of air data system 120A, which is similar (or in the alternative identical) to systems 120B–120D. System 120A includes a microphone array or sensor array 200 which comprises four microphones or hydrodynamic sensors 201–204. In the embodiment illustrated, the first and second sensors 201 and 202 are positioned on a first side of axis 118, while the third and fourth sensors 203 and 204 are positioned on the opposite side of axis 118. Each of sensors 201–204 are electrically or otherwise operably coupled to an air data computer or other processing circuitry 210. Air data computer 210 implements methods of the present invention using one or more of the four microphone arrays. These methods are described below in greater detail.

Using the methods of the present invention, component flow measurements are taken by air data computer 210. For the X direction (shown in the X-Y coordinate system in FIG. 3), with the first sensor 201 serving as a reference sensor, flow velocity $V_{12}$ between the first and second sensors 201 and 202 is used to provide negative X direction information. With the third sensor 203 serving as a reference sensor, flow velocity $V_{34}$ between the third and fourth sensors 203 and 204 is used to provide positive X direction information. For the Y direction, with the second sensor 202 serving as the reference sensor, flow velocity $V_{23}$ between the second and third sensors 202 and 203 is used to provide negative Y direction information. With fourth sensor 204 serving as the reference sensor, flow velocity $V_{41}$ between the fourth and first sensors 204 and 201 is used to provide positive Y direction information.

Of course, the sensor combinations can be changed in other embodiments, for example, the sensor pairs used to provide the positive and negative Y direction information can be switched if desired. Further, it is not necessary to separately calculate flow in the negative X and Y directions in all embodiments since flow in the corresponding positive directions can be indicative of flow in the negative directions using some velocity determining methods. Also, while four sensors are shown, in other embodiments as few as three sensors could be used. For example, flow velocity in the X direction can be measured between sensors 203 and 204, while flow velocity in the Y direction can be measured between sensors 204 and 201.

The component flow velocity information in the X and Y directions is then used to give flow angle α to within whatever resolution is available from the velocity measurements. The higher the velocity measurement resolution achieved, the higher the flow angle resolution. TAN(α) is equal to $V_y/V_x$, where $V_y$ is the above-described flow velocities $V_{23}$, $V_{41}$, or an average of $V_{23}$ and $V_{41}$, and wherein $V_x$ is the above-described flow velocities $V_{12}$, $V_{34}$, or an average of $V_{12}$ and $V_{34}$. Therefore, $TAN^{-1}(V_y/V_x)$ equals flow angle α. Flow angle α is the local angle of attack of the airflow.

Using the four sensor array and methods of flow angle determination of the present invention, it can be seen that the number of sensors required is greatly reduced as compared to the prior art. Further, unlike the prior art, the present invention works in the case of separated flow.

As mentioned, one method of determining the component velocity information involves cross-correlation analysis to determine the time lag or delay between a stimulus and a response, with the stimulus being the convected turbulent boundary layer pressure fluctuations at the reference sensor, and the response being the pressure fluctuation received at the sensor paired with the reference sensor for a particular component measurement. As described in the Loschke et al. patent, a method of measuring the similarity between two waveforms is to multiply them together, ordinate by ordinate, and to add the products over the duration of the waveforms (cross-correlation). Methods of calculating the cross-correlation between two waveforms are well known in the art, and are therefore not described here in detail.

The transit times between the reference sensor and the down-stream sensor of the sensor pair, separated by the distance S, are determined by the peak in the calculated cross-correlation functions for each pair. The time delay identifies the convention velocity, which is the component flow velocity discussed above. The boundary layer convention velocity $V_{ij}$ is calculated as in Equation 1:

$$V_{ij} = \frac{S_{ij}k}{(\Delta t_{\min})}, \qquad \text{Equation 1}$$

where $S_{ij}$ is the distance between the sensors i and j and k is a calibration constant that is approximately 0.8.

While a cross-correlation analysis such as the one described above and in greater detail in the Loschke et al. patent is one method of determining the velocity component measurements of airflow between first and second sensors of the three or four sensor arrays, the present invention is not limited to use of a cross-correlation analysis. Instead, any technique for measuring or estimating the X and Y component velocities of the airflow can be used.

Typically, in acoustic air data systems, the acoustic sensors are mounted flush on the aircraft skin in order to sense pressure fluctuations on the skin. In order to achieve this flush mounting, there are typically holes formed in the aircraft skin to give the acoustic sensors access to the pressure fluctuations. In accordance with an additional aspect of some embodiments of the present invention, the microphone style acoustic sensors are replaced with accelerometers, strain gauges, or other non-acoustic sensors on the inner surface of the aircraft skin, or on an aircraft skin membrane, which sense acceleration, movements, and other responses of the skin or membrane to pressure fluctuations to be measured. This "through the skin" air data measurement concept functions in a manner similar to acoustic systems, but eliminates any need for forming acoustic sensor holes in the aircraft skin, which is desirable because forming sensor holes in the aircraft skin requires significant design and testing efforts to ensure that flight and performance of the aircraft is not detrimentally affected.

FIG. 4A is a diagrammatic illustration of a first through the skin air data measurement system 400-1 in accordance with the present invention. As shown in FIG. 4A, air data measurement system 400-1 includes non-acoustic sensors 401–404 positioned inside of, and in contact with, aircraft skin 420. Sensors 401–404 can be, for example, accelerometers, strain gages, or other non-acoustic sensors which sense acceleration, movements, and other responses of skin 420 to outside pressure fluctuations which are to be measured.

Air data computer 410 is coupled to each of sensors 401–404, and based upon outputs from these sensors, determines physical characteristics of the incident flow stream over the surface of skin 420. For example, in some embodiments, sensors 401–404 are arranged in a four-sensor array configuration such as described above with reference to FIGS. 2 and 3. In these embodiments, air data computer 410 is configured to measure fluid flow velocities in a first direction (the X direction) and in a second direction (the Y direction), and to calculate an angular direction of flow as a function of the first and second measured fluid flow velocities in the manner described above. Further, each of the through the skin air data measurement systems shown in FIGS. 4A–4D can be used to implement the air data systems shown in FIGS. 2 and 3. However, the through the skin air data systems shown in FIGS. 4A–4D can also be used in other configurations, or to sense other characteristics of the fluid flow stream over a surface of the aircraft.

In order to correctly interpret signals from sensors 401–404, the signal conditioning characteristics of aircraft skin 420 will need to be identified and accounted for in the signal processing, such as in the processing within air data computer 410. Some sensor types, such as accelerometers, will detect aircraft movements in addition to the desired signals. For example, an accelerometer will pick up aircraft and maneuver accelerations in addition to the desired signals corresponding to pressure fluctuations. To compensate, an optional reference sensor 405 (such as a reference accelerometer) can be mounted next to the sensors 401–404, and the reference signal can be used to subtract these effects out of the signals from the primary sensors. While one reference sensor 405 is shown for purposes of illustration, if desired, a separate reference sensor can be used for each of the primary sensors.

While primary sensors 401–404 can be passive instruments, in other embodiments an excitation or resonant device 422 is optionally used to excite or vibrate skin 420. With pre-characterization of the effects of pressure fluctuations on the excitation response of skin 420, sensors 401–404 and air data computer 410 can detect changes in the vibration of skin 420, thus providing the desired pressure fluctuation dependent information. Excitation device 422 can be a piezoelectric device, a magnetostrictive device, or any other device which can be used to excite aircraft skin 420 or other membranes.

Figure 4B:
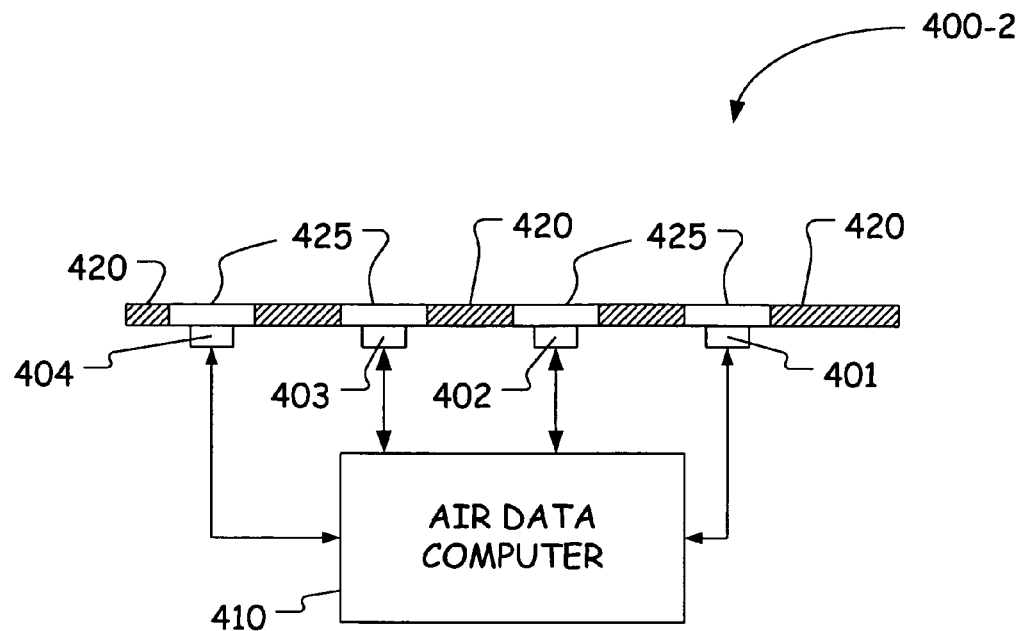
Figure 4C:
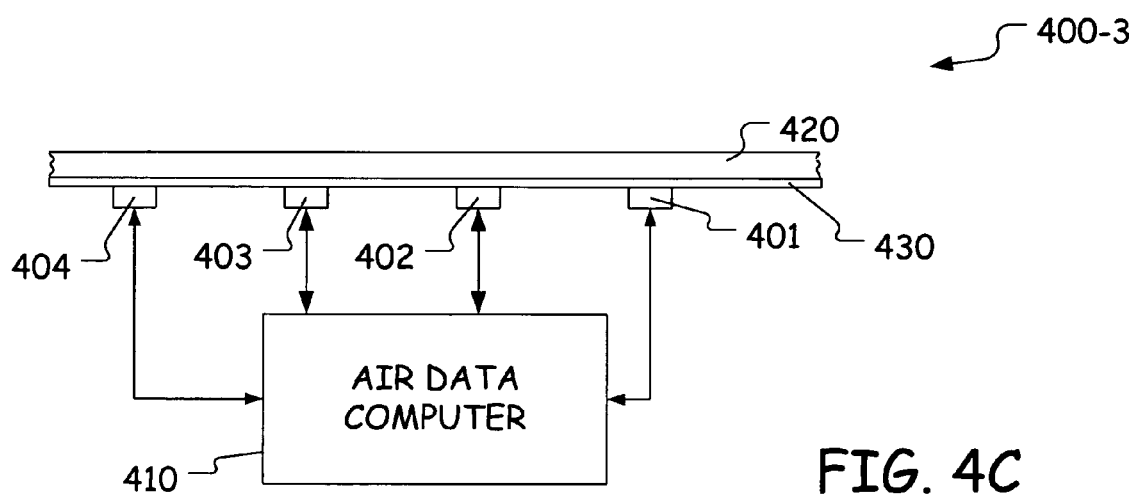
Figure 4D:
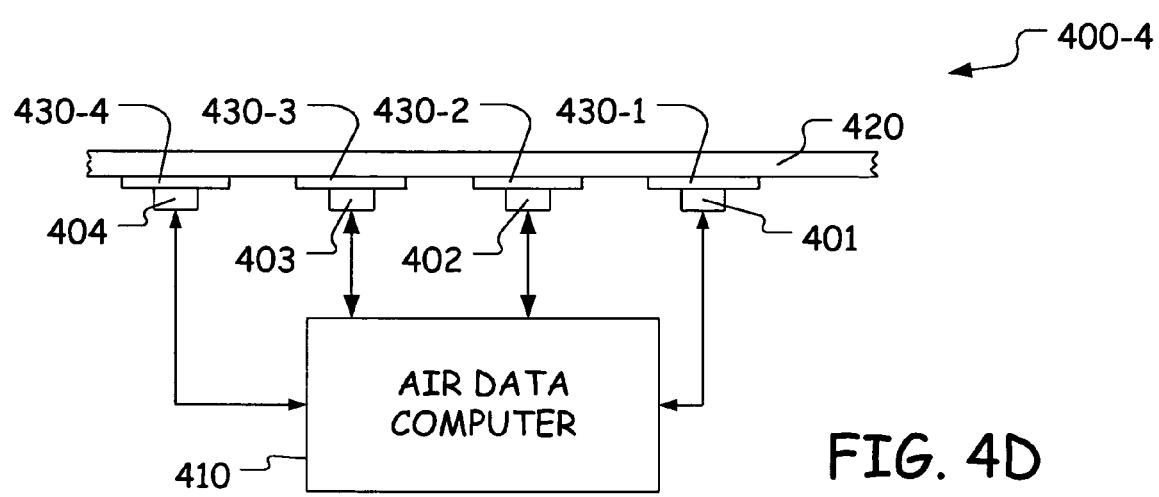

FIGS. 4B–4D illustrate three additional embodiments of a through the skin air data system in accordance with the present invention. While reference sensor 405 and excitation device 422 are not shown in FIGS. 4B–4D, these features can be included in these three additional embodiments as well.

FIG. 4B illustrates through the skin air data system 400-2 in accordance with an alternate embodiment of the present invention. System 400-2 differs from system 400-1 in that it includes membranes or membrane sections 425 flush with and interposed between sections of aircraft skin 420. Sensors 401–404 are each positioned in contact with or adjacent to a membrane section. If desired, all of sensors 401–404 can be positioned adjacent a single flush membrane section. Since the aircraft skin may not in all instances be an effective transmitter of pressure fluctuations, a thinner or otherwise more optimal membrane 425 can be used. Since the membrane 425 is still flush with the outer surface of aircraft skin 420, the disadvantages of prior art acoustic air data systems can be avoided.

FIGS. 4C and 4D illustrate third and fourth embodiments 400-3 and 400-4 of a through the skin air data system in accordance with the present invention. The system 400-3 shown in FIG. 4C is similar to the system 400-2 shown in FIG. 4B in that sensors 401–404 are positioned in contact with or adjacent to a membrane 430 other than the aircraft skin. The embodiment shown in FIG. 4C differs, however, in that membrane 430 is not flush with and interposed between portions of aircraft skin 420. Instead, membrane 430 is positioned immediately adjacent to and in contact with the aircraft skin 420. System 400-4 shown in FIG. 4D differs from system 400-3 shown in FIG. 4C in that membrane 430 is divided into membrane segments 430-1 through 430-4, each with a corresponding sensor positioned adjacent thereto.

An advantage provided by air data systems 400-1 through 400-4 includes that placement of the sensors is non-intrusive as compared to traditional acoustic air data systems. Through the skin air data systems such as the ones described can use readily available, existing sensor technology. Further, these systems can be designed to operate on low power, since they are not exposed to icing conditions. Arrays of sensors in these air data systems can be configured to measure airspeed, aircraft angle of attack (AOA) and aircraft angle of side-slip (AOS). The systems can be designed with high durability since there is little or no exposure to the outside environment.

Although the present invention has been described with reference to preferred embodiments, workers skilled in the art will recognize that changes may be made in form and detail without departing from the spirit and scope of the invention. For example, the present invention can be used in any type of aircraft, including fixed and rotary wing aircraft. Further, the present invention can be used in other environments such as rockets, etc. Therefore, these vehicles are considered as "aircraft" in the context of the present invention. Also, while the sensors are illustrated in a rectangular or square configuration which defines orthogonal X and Y directions, other geometric configurations can also be used, along with geometric relationship to calculate the component velocities.

What is claimed is:

1. A system for determining physical characteristics of an incident flow stream over a surface of a vehicle, the system comprising:
    a plurality of acoustic sensors mounted to the surface and configured to sense pressure fluctuations caused by the incident flow stream, the plurality of acoustic sensors providing output signals indicative of the sensed pressure fluctuations; and
    processing circuitry coupled to the plurality of acoustic sensors, the processing circuitry measuring flow velocity in a first direction as a function of the output signals of at least two of the plurality of acoustic sensors, and measuring flow velocity in a second direction as a function of the output signals of at least two of the plurality of acoustic sensors, the processing circuitry configured to calculate an angular direction of flow as a function of the first and second measured flow velocities.

2. The system of claim 1, wherein the first and second directions are X and Y directions, respectively, orthogonal and wherein the processing circuitry is configured to measure the flow velocity in the first direction by measuring flow velocity in a positive X direction and flow velocity in a negative X direction, and wherein the processing circuitry is configured to measure the flow velocity in the second direction by measuring both flow velocity in a positive Y direction and flow velocity in a negative Y direction.

3. The system of claim 2, wherein the plurality of acoustic sensors includes a plurality of microphones.

4. The system of claim 2, wherein the plurality of acoustic sensors includes first, second, third and fourth acoustic sensors.

5. The system of claim 4, wherein the processing circuitry is configured to measure flow velocity in the negative X direction as a function of the output signals of the first and second acoustic sensors, and to measure flow velocity in the positive X direction as a function of the output signals of the third and fourth acoustic sensors.

6. The system of claim 5, wherein the processing circuitry is configured to measure flow velocity in the negative Y direction as a function of the output signals of either the second and third acoustic sensors or the fourth and first acoustic sensors, and to measure flow velocity in the positive Y direction as a function of the other of the output signals of the second and third acoustic sensors and the fourth and first acoustic sensors.

7. The system of claim 2, wherein the processing circuitry is configured to measure the flow velocities as functions of cross-correlations of the sensor output signals.

8. The system of claim 2, wherein the processing circuitry is configured to calculate the angular direction of flow as a function of the inverse tangent of a ratio of flow velocities in the Y and X directions.

9. The system of claim 1, wherein the processing circuitry includes an air data computer.

10. An aircraft including the system of claim 1.

11. An aircraft including a plurality of systems as defined in claim 1.

12. The system of claim 1, wherein the plurality of acoustic sensors consists of four acoustic sensors.

13. A method of determining physical characteristics of an incident flow stream over a surface of a vehicle, the method comprising:
    sensing pressure fluctuations caused by the incident flow stream, using a plurality of acoustic sensors mounted to the surface, and providing output signals indicative of the sensed pressure fluctuations;
    measuring flow velocity in a first direction as a function of the output signals of at least two of the plurality of acoustic sensors;
    measuring flow velocity in a second direction as a function of the output signals of at least two of the plurality of acoustic sensors; and
    calculating an angular direction of flow as a function of the first and second measured flow velocities.

14. The method of claim 13, wherein the first and second directions are orthogonal X and Y directions, respectively, and wherein measuring flow velocity in the first direction further comprises measuring flow velocity in a positive X direction and flow velocity in a negative X direction, and wherein measuring flow velocity in the second direction further comprises measuring flow velocity in a positive Y direction and flow velocity in a negative Y direction.

15. The method of claim 14, wherein the plurality of acoustic sensors includes first, second, third and fourth acoustic sensors, wherein measuring flow velocity in the negative X direction further comprises measuring flow velocity in the negative X direction as a function of the output signals of the first and second acoustic sensors, wherein measuring flow velocity in the positive X direction further comprises measuring flow velocity in the positive X direction as a function of the output signals of the third and fourth acoustic sensors.

16. The method of claim 15, wherein measuring flow velocity in the negative Y direction further comprises measuring flow velocity in the negative Y direction as a function of the output signals of either the second and third acoustic sensors or the fourth and first acoustic sensors, and wherein measuring flow velocity in the positive Y direction further comprises measuring flow velocity in the positive Y direction as a function of the other of the output signals of the second and third acoustic sensors and the fourth and first acoustic sensors.

17. A system for determining physical characteristics of an incident flow stream over an outer surface of a vehicle, the system comprising:

a plurality of sensors mounted to a first surface adjacent the outer surface of the vehicle and configured to sense movement of the first surface caused by pressure fluctuations due to the incident flow stream, the plurality of sensors providing output signals indicative of the sensed movement of the first surface and thereby of the pressure fluctuations; and processing circuitry coupled to the plurality of sensors, the processing circuitry configured to determine the physical characteristics of the incident flow stream as a function of the sensor output signals.

18. The system of claim 17, wherein the plurality of sensors include a plurality of strain gauges.

19. The system of claim 17, wherein the plurality of sensors include a plurality of accelerometers.

20. The system of claim 17, wherein first surface is an inner surface of the vehicle.

21. The system of claim 20, wherein the first surface is an inner surface of an aircraft skin.

22. The system of claim 17, wherein the first surface is a membrane surface positioned adjacent the outer surface of the vehicle.

23. The system of claim 22, wherein the membrane surface includes a plurality of membrane sections interposed between sections of the outer surface of the vehicle.

24. The system of claim 22, wherein the membrane surface is positioned behind the outer surface of the vehicle.

25. The system of claim 24, wherein the membrane surface includes a plurality of membrane sections.

26. The system of claim 17, and further comprising at least one reference sensor coupled to the processing circuitry, the at least one reference sensor sensing movement of the first surface which is not due to the pressure fluctuations caused by the incident flow stream, the at least one reference sensor providing reference sensor outputs in response, the processing circuitry being configured compensate the determination of the physical characteristics using the reference sensor outputs.

27. The system of claim 17, and further comprising an excitation device coupled to the first surface, the excitation device exciting the first surface in a known manner to obtain an excitation response, wherein the plurality of sensors mounted to the first surface sense movement of the first surface caused by the pressure fluctuations by detecting changes in the excitation response.

28. The system of claim 17, wherein the processing circuitry is configured to measure flow velocity in a first direction as a function of the output signals of at least two of the plurality of sensors, and to measure flow velocity in a second direction as a function of the output signals of at least two of the plurality of sensors, the processing circuitry being further configured to calculate an angular direction of flow as a function of the first and second measured flow velocities.

29. The system of claim 28, wherein the first and second directions are orthogonal X and Y directions, respectively, and wherein the processing circuitry is configured to measure the flow velocity in the first direction by measuring both flow velocity in a positive x direction and flow velocity in a negative X direction, and wherein the processing circuitry is configured to measure the flow velocity in the second direction by measuring both flow velocity in a positive Y direction and flow velocity in a negative Y direction.

30. The system of claim 29, wherein the plurality of sensors includes first, second, third and fourth sensors.

31. The system of claim 30, wherein the processing circuitry is configured to measure flow velocity in the negative X direction as a function of the output signals of the first and second sensors, and to measure flow velocity in the positive X direction as a function of the output signals of the third and fourth sensors.

32. The system of claim 31, wherein the processing circuitry is configured to measure flow velocity in the negative Y direction as a function of the output signals of either the second and third sensors or the fourth and first sensors, and to measure flow velocity in the positive Y direction as a function of the other of the output signals of the second and third sensors and the fourth and first sensors.

33. An aircraft including the system of claim 17.

* * * * *